United States Patent Office 3,089,896
PREPARATION OF ENOLATES OF 2,2,4,4-TETRA-
ALKYLACETOACETIC ESTERS
Raymond D. Clark, Kingsport, Tenn., assignor to Eastman Kodak Company, Rochester, N.Y., a corporation of New Jersey
No Drawing. Filed Sept. 20, 1961, Ser. No. 139,364
3 Claims. (Cl. 260—483)

This invention relates to the preparation of reactive alkali-metal enolates of 2,2,4,4-tetraalkylacetoacetic esters. More particularly, it relates to the preparation of such enolates by the reaction of β-lactones of 2,2,4,4-tetraalkyl-3-hydroxy-3-butenoic acids with alkali-metal alkoxides.

The metal enolates of 2,2,4,4-tetraalkylacetoacetic esters are valuable chemical intermediates. The literature provides evidence of the reactivity and utility of enolates in general. See, for example, Hauser et al., "Organic Reactions," vol. I, John Wiley & Sons, Inc., New York, 1942, pages 266–302; Hauser et al., "Organic Reactions," vol. VIII, John Wiley & Sons, Inc., New York, 1954, pages 57–196; and Cope et al., "Organic Reactions," vol. IX, John Wiley & Sons, Inc., New York, 1957, pages 107–331. The literature shows that metal enolates undergo a variety of reactions. For example, they may be acylated, alkylated or coupled. Esters and acyl halides are examples of acylating agents. Related to acylation is the reaction with nitriles to yield a similar product after hydrolysis. Enolates may be alkylated with a wide variety of compounds but three general categories serve to illustrate the reaction: alkylation with (1) alkyl halides, (2) alkyl esters of inorganic acids and (3) epoxides. Enolates also undergo coupling reactions with halogens.

A distinguishing feature of the enolates of 2,2,4,4-tetraalkylacetoacetic esters is that when subjected to the various reactions indicated, the alkylation, arylation, acylation or the like occurs at the 4-position of the enolate. This distinguishes these enolates from enolates produced from diketene which are enolates of unsubstituted acetoacetic esters. With the latter types of enolates the reactions such as alkylation, arylation, etc. occur at the 2-position rather than at the 4- position.

The usual method of preparing enolates of the type prepared by my process requires a number of steps. In the known method, sodium triphenylmethide is prepared from sodium amalgam and triphenylchloromethane. The sodium triphenylmethide then is used in the preparation of the 2,2,4,4-tetraalkylacetoacetic ester by the Claisen condensation or by the reaction of isobutyryl chloride with the sodium enolate of ethyl isobutyrate. Finally, the sodium enolate of the 2,2,4,4-tetraalkylacetoacetic ester is generated in situ by adding sodium triphenylmethide to the substituted acetoacetic ester thus prepared. This procedure is tedious, the product is contaminated with triphenylmethane and the yields are low. The process of the present invention is an improvement in at least three respects, namely: (1) the process is simpler, (2) the starting materials are available in quantity, and (3) the product is not contaminated by triphenylmethane.

An advantage of my new process that should also be noted is that the β-lactones employed as starting materials in the process are normally liquid substances and are thus quite convenient to use as chemical reactants.

The process of the invention, in general, comprises forming a reaction mixture comprising a β-lactone of a 2,2,4,4-tetraalkyl-3-hydroxy-3-butenoic acid and at least an equimolar amount of an alkali-metal alkoxide, in the absence of labile hydrogen atoms, maintaining the reaction mixture at a reaction temperature about 50° C. to 150° C. and recovering the alkali-metal enolate as a reaction product. Thus, characterizing elements of the process are: (1) a stoichiometric amount of the alkali-metal alkoxide is employed, (2) the reaction is carried out in the absence of labile hydrogen atoms and (3) the reaction is carried out at a moderate temperature, i.e., below 150° C., but above about 50° C.

An important element of my process is that the alkali-metal alkoxide and the lactone are reacted in substantially stoichiometric ratios. In forming the reaction mixture at least an equimolar amount of the alkoxide should be present. If excess alkoxide is present, the lactone is converted to the enolate by reaction with an equivalent weight of alkoxide and the excess alkoxide remains unchanged but, if the ratio of the alkoxide to the lactone is less than 1 mole per mole, the excess lactone is lost in undesirable side reactions and the yield of enolate is decreased accordingly.

I have found that superior yields of enolate are obtained with a reaction temperature in the range of 70 to 90° C. The enolate can be obtained in lower yields at somewhat higher and lower temperatures. However, at temperatures below 50° C. the lactone polymerizes instead of forming an enolate. At temperatures above 150° C., the yield of enolate is drastically reduced. Accordingly, the reaction is carried out at a temperature in the range of 50° to 150° C. and preferably 70° to 90° C.

The process of the invention can be carried out in a simple manner by moderately heating a mixture of the lactone, the alkali-metal alkoxide and, preferably, an inert solvent. With the lower homologs of the class of suitable lactone starting materials, such as tetramethyl-3-hydroxy-3-butenoic acid β-lactone, the reaction is very exothermic and should be controlled by slow addition of the β-lactone to the mixture of alkoxide and solvent.

A solvent is not essential to the reaction. However, the desired product is a solid and thus a more complete reaction is obtainable with the moderation of a solvent. The use of a solvent also aids in temperature control and helps to avoid overheating. Examples of suitable inert solvents include hydrocarbons such as benzene, toluene or hexane; cyclic or acyclic ethers such as diethyl ether or tetrahydrofuran; and cyclic or acyclic tertiary amines such as triethylamine or pyridine.

As already stated, the process of the invention is carried out in the absence of labile hydrogen atoms. I avoid the use of solvents such as alcohols, water, amines, acids, etc., which have a hydrogen atom that is easily removable as a proton. By carrying out the reaction in the absence of labile hydrogen atoms, I obtain as product a reactive metal enolate which is valuable as an intermediate and avoid producing an unreactive acetoacetic ester.

The enolate product can be recovered as a slurry or a solution, depending on the solvent used. It can also be recovered as a solid if the solvent is removed in the absence of oxygen or water vapor at room temperature or thereabout.

The β-lactones of 2,2,4,4-tetraalkyl-3-hydroxy-3-butenoic acids employed as reactants in my process are compounds of the formula:

wherein $R^1$, $R^2$, $R^3$ and $R^4$ are the same or different alkyl radicals of from 1 to 4 carbon atoms. The pair of substituents $R^1$ and $R^2$ and/or the pair of substituents $R^3$ and $R^4$ can also be alkylene groups, which with the carbon atom to which they are attached, form a 5 or 6 membered saturated carbocyclic ring. For convenience, I use the term tetraalkyl to designate all of such tetrasubstituted 3-hydroxy-3-butenoic acid lactones.

The tetraalkyl-3-hydroxy-3-butenoic acid β-lactones can be prepared by the catalytic rearrangement of tetraalkyl-1,3-cyclobutanediones, as disclosed in my co-pending U.S. patent application Serial No. 108,739, filed May 9, 1961. The procedure comprises heating a reaction mixture of the dione and a catalytic amount of an aprotonic Lewis acid, such as aluminum chloride, at a temperature of 100 to 175° C. The tetraalkyl-1,3-cyclobutanediones can in turn be prepared by dimerization of disubstituted ketenes, such as dimethylketene, diethylketene, ethylmethyl-ketene, butylethylketene, diisobutylketene, tetramethyl-eneketene, pentamethyleneketene, etc. ("Organic Reactions," R. Adams, editor, John Wiley and Sons, New York, 1946, vol. 3, chapter 3, "Preparation of Ketenes and Ketene Dimers.") The disubstituted ketenes are available in quantity by a method described in the co-pending application of R. H. Hasek and E. U. Elam, Serial No. 841,961, filed September 24, 1959.

In general, my process can employ alkali-metal alkoxides prepared from any aliphatic straight or branched chain alcohol having from 1 to about 12 carbon atoms per molecule. Best results are obtained with the alkoxides prepared from methanol and ethanol and for economic reasons the preferred alkali metal is sodium.

The process of the invention is further illustrated by the examples which follow:

*Example 1*

A mixture of 26.0 g. (about 0.5 mole) of sodium methoxide (Tech.) and 100 ml. of benzene was heated to 70° C. and was shaken vigorously while 70.0 g. (0.5 mole) of 2,2,4-trimethyl-3-hydroxy-3-pentenoic acid, lactone was slowly added. The mixture was allowed to stand for 10 minutes. The sodium enolate of methyl 2,2,4-trimethyl-3-oxovalerate thus was obtained as a slurry. In order to characterize the enolate, the mixture was poured into water and neutralized with sulfuric acid. Two layers separated. The organic layer was removed and dried with anhydrous magnesium sulfate. The organic extract was distilled through a packed column. It contained 39.60 g. (46%) of methyl 2,2,4-trimethyl-3-oxovalerate, B.P. 186–188° C., $n_D^{20}$ 1.4235.

*Example 2*

A mixture of 28.0 g. (about 0.5 mole) of sodium methoxide (Tech.) and 250 ml. of tetrahydrofuran was heated under reflux with stirring while 70.5 g. (0.50 mole) of 2,2,4-trimethyl-3-hydroxy-3-pentenoic acid, lactone was added over a period of 10 minutes. The mixture was stirred for an additional 10 minutes. The sodium enolate of methyl 2,2,4-trimethyl-3-oxovalerate was thus obtained as a light yellow solution in tetrahydrofuran.

As further proof of the identity of the enolate the following acylation reaction [patterned after that of B. E. Hudson and C. R. Hauser, J. Am. Chem. Soc., 61, 3567 (1939)] was carried out.

*Example 3*

The solution containing the enolate as obtained in Example 2, was slowly added to a mixture of 35.5 ml. (39.3 g., 0.5 mole) of acetyl chloride in 150 ml. of tetrahydrofuran during a period of 15 minutes. The resulting mixture was stirred for 1 hour and then poured into 300 ml. of water. The layers were separated and the aqueous layer was again extracted with 300 ml. of ethyl ether. The combined organic extracts were dried with anhydrous magnesium sulfate, filtered and distilled. Methyl 2,2,4,4-tetramethyl-3,5-diketohexanoate, B.P. 59.5–60° C. (0.5 mm.), $n_D^{20}$ 1.4484–1.4490, was thus obtained in 23% yield (25.0 g.).

*Analysis.*—Calcd. for $C_{11}H_{18}O_4$: C, 61.66; H, 8.47; Mol. wt., 214; Sap. eq., 214.2. Found: C, 61.34; H, 8.54; Mol. wt., 220; Sap. eq. 1076.

*Example 4*

A mixture of 113.0 g. (about 2.0 moles) of sodium methoxide (Tech.) and 1000 ml. of tetrahydrofuran was stirred and heated under reflux while a nitrogen atmosphere was maintained over it by slowly bubbling nitrogen through the mixture. 2,2,4-trimethyl-3-hydroxy-3-pentenoic acid, lactone (280.2 g., 2.0 moles) was added over 25 minutes. After all of the lactone had been added refluxing was continued for 15 minutes. The temperature then was reduced to less than room temperature and nitrogen was blown over the mixture to remove the solvent. After two hours solid appeared. The remainder of the solvent then was removed by drying under vacuum at room temperature. The sodium enolate of methyl 2,2,4-trimethyl-3-oxovalerate was thus obtained as a light yellow solid (387.6 g., 98%).

As illustrated by the above examples, the process of the invention is uniquely adapted for producing the metal enolate as an isolated compound which is highly reactive and can subsequently be subjected to various reactions such as alkylation, acylation, hydrolysis and coupling to yield many valuable derivatives. However, in many instances the metal enolate can be prepared in accordance with the invention in situ with the reagent for the subsequent reaction. Thus, a reaction mixture can be formed of stoichiometric proportions of the β-lactone, the alkali-metal alkoxide and the reagent for preparing the derivative of the enolate. The reagent for producing the desired derivative, which reagent, for example, can be an aralkyl halide such as benzyl chloride, can serve as a reaction solvent but must not be extremely reactive with the alkali-metal alkoxide or with the β-lactone because they must not be consumed by such a side reaction before the metal enolate is formed.

The invention has been described in considerable detail with particular reference to certain preferred embodiments thereof, but it will be understood that variations and modifications can be effected within the spirit and scope of the invention as described hereinabove, and as defined in the appended claims.

I claim:

1. The process for preparing a metal enolate of a 2,2,4,4-tetraalkylacetoacetic ester which comprises forming a reaction mixture free of substances having a labile hydrogen atom, and comprising a β-lactone of a 2,2,4,4-tetraalkyl-3-hydroxy-3-butenoic acid and an alkali-metal alkoxide, said reaction mixture containing at least one mole of said alkoxide per mole of said lactone, and maintaining the reaction mixture at a reaction temperature of 50° to 150° C.

2. The process for preparing an alkali metal enolate of a 2,2,4,4-tetramethylacetoacetic ester which comprises forming a reaction mixture free of substances having a labile hydrogen atom and comprising the β-lactone of 2,2,4,4-tetramethyl-3-hydroxy-3-butenoic acid and an alkali metal alkoxide in a ratio of at least one mole of said alkoxide per mole of said lactone, and maintaining the reaction mixture at a temperature of 70° to 90° C.

3. The process for preparing the sodium enolate of methyl 2,2,4-trimethyl-3-oxovalerate which comprises forming a reaction mixture of the β-lactone of 2,2,4,4-tetramethyl-3-hydroxy-3-butenoic acid, at least one mole of sodium methoxide per mole of said lactone and an inert solvent, and free of substances having a labile hydrogen atom, heating the reaction mixture and maintaining the temperature thereof in the range of 70° to 90° C., and recovering said enolate from the reaction mixture as a dry product.

No references cited.